Dec. 25, 1951     C. A. ADAMS     2,579,639
BATTERY CART
Filed March 15, 1949
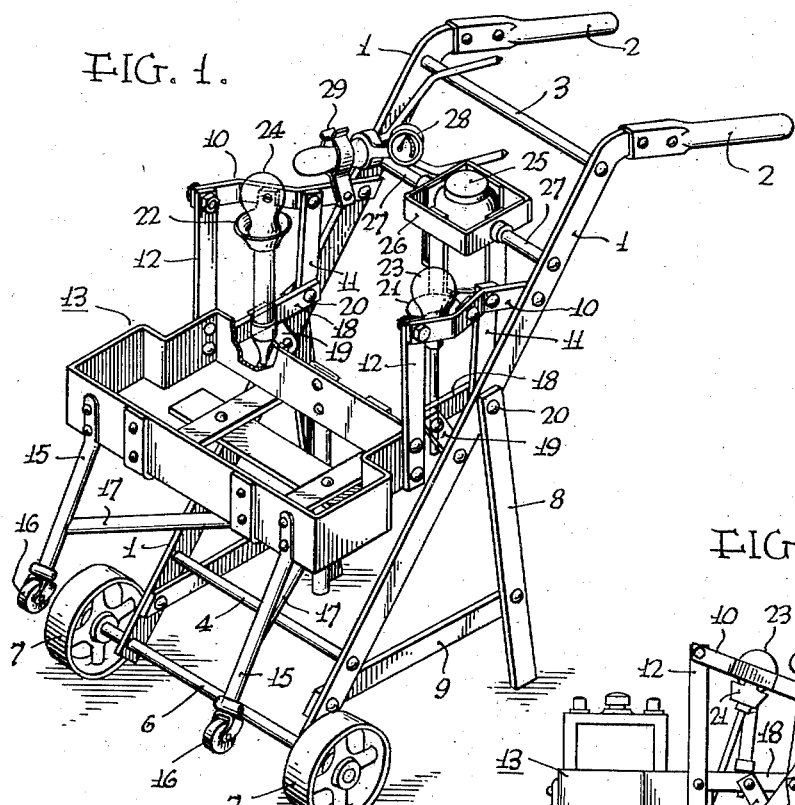
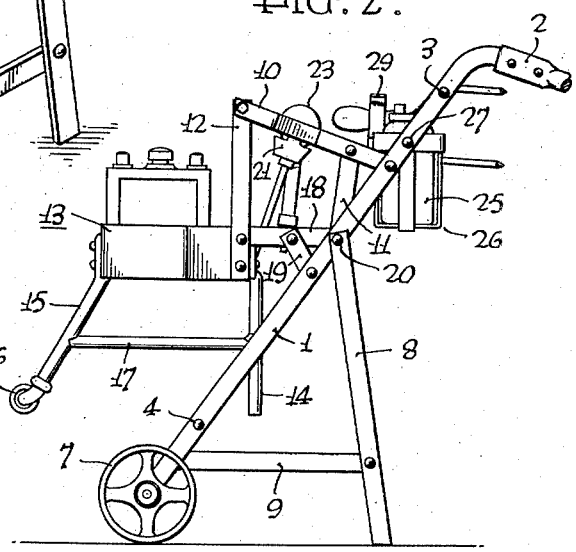
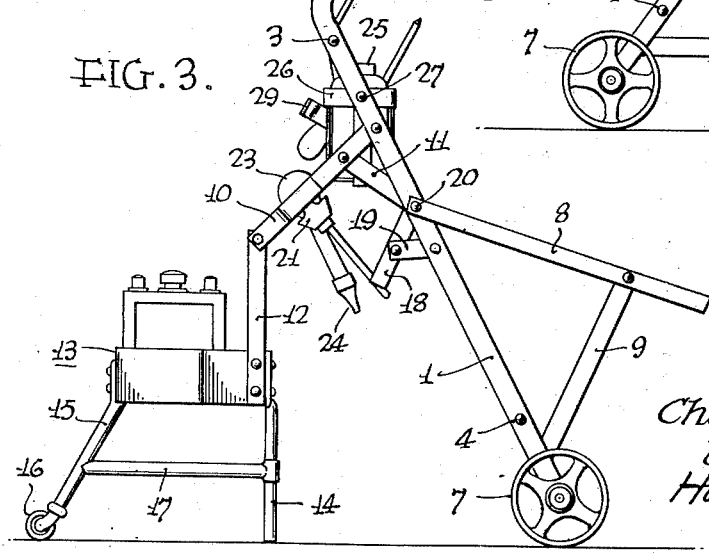
Inventor:
Charles A. Adams
by his Attorneys
Howson &
Howson Patented Dec. 25, 1951

2,579,639

UNITED STATES PATENT OFFICE 2,579,639

BATTERY CART

Charles A. Adams, Tampa, Fla.

Application March 15, 1949, Serial No. 81,540

2 Claims. (Cl. 280—53)

This invention relates to new and useful improvements in pushcarts, and more particularly to pushcarts for use in transporting and handling of storage batteries and other heavy objects from place-to-place in and around automobile garages, service stations and the like.

The average storage battery used in automobiles and other motor-powered vehicles weighs from about fifty to seventy-five pounds and it is difficult and burdensome to carry them about.

With this in mind, the principal object of the present invention is to provide a novel pushcart or the like which is constructed and arranged to transport heavy storage batteries and the like from place-to-place as required.

Another object of the invention is to provide a pushcart for storage batteries and the like as set forth which is constructed and arranged in one position of the cart to support the battery at a lower elevation or height than that in which the battery is supported in the normal cart position.

Another object of the invention is to provide a novel battery cart as set forth having associated therewith the usual equipment and devices customarily utilized in the filling, checking and testing of storage batteries.

A further object of the invention is to provide a battery cart having the features and advantages set forth which is of relatively simple and inexpensive construction and which is highly effective in operation and use.

These and other objects of the invention and the various features and details of the construction and operation thereof are hereinafter fully set forth and described with reference to the accompanying drawing, in which:

Fig. 1 is a view in perspective of a storage battery cart made according to the present invention;

Fig. 2 is a side elevational view of the disclosure in Fig. 1; and

Fig. 3 is a side elevational view showing the cart in a forwardly tilted position with the battery-carrying tray thereof disposed in a lower position upon the ground or other surface.

Referring now more particularly to the drawing, a storage battery cart made according to the present invention comprises a pair of relatively spaced parallel frame members 1 which, in the normal position of the cart shown in Figs. 1 and 2, incline rearwardly and have their upper ends curved outwardly in a substantially horizontal direction with handles 2 fixed thereon. The frame members 1 are maintained in the described parallel relationship by means of cross-rods or braces 3 and 4, respectively, connected therebetween.

Extending through suitable openings provided in the lower ends of the frame members 1 is an axle 6 having ground wheels 7 secured on the opposite ends thereof outwardly adjacent said frame members 1. Fixedly secured to and depending from the frame members 1 are supports or legs 8 and the lower end portions of these legs 8 are connected by means of brace members 9 to the lower ends of the frame members 1 to provide a substantially rigid structure.

Fixedly secured to and projecting forwardly from the frame members 1 are relatively spaced brackets 10. These brackets 10 are further supported from the frame members 1 by means of braces or legs 11 which are connected between the said frame members and forwardly projecting brackets 10, respectively.

Pivotally connected to and depending from the forward ends of the brackets 10 are hanger members 12. Fixedly secured to the lower ends of the hangers 12 is a battery tray generally designated 13 and having a configuration designed to receive and support therein storage batteries of conventional shapes and sizes. Secured to and depending from the rear edge of the battery tray 13 are legs 14 and declining forwardly from the front edge of the said tray 13 are other legs 15 having rollers or casters 16 secured in their lower extremities. These pairs of legs 14 and 15 are connected together by members 17 to provide a substantially rigid structure.

In order that the battery tray 13 will be disposed horizontally when the cart is in the normal position shown in Fig. 2, stops or arms 18 are fixedly secured to the frame members 1 and project forwardly therefrom to be engaged by the rearward wall of the battery tray 13 as shown. As in the case of the brackets 10, these arms or stops 18 are supported by means of brace members 19 connected respectively between the frame members 1 and arm members 18. The upper end of each frame leg 8 and the lower end of the bracket support leg 11 and the stop arm 18 at each side of the cart may be secured to the frame member 1 by means of the same rivet or other suitable fastening means 20.

By virtue of the pivotal connection of the hangers 12 to the forward extremities of the bracket 10, it is possible when loading a battery into the tray or removing it, to tilt the cart bodily forward into the position shown in Fig. 3 of the drawing and thereby position the battery tray 13 at a relatively lower height with its legs 14 and 15 resting upon the ground or other surface. When the cart is again returned to the normal position shown in Figs. 1 and 2 of the drawing, the battery tray 13 will swing inwardly to the position shown in Fig. 2 in abutting relation against the forward ends of the arms or stops 18 which maintain it in the horizontal position.

Secured to the brackets 10 are supports 21 and 22, respectively, for the usual battery testing hydrometer 23 and syringe 24 for replenishing the distilled water supply in the battery as required. A supply of distilled water is contained in a jar 25 removably carried in a rack 26 which is pivotally suspended between the ends of aligned pins 27 which are secured to and extend inwardly toward each other from the frame members 1. An ampere meter 28 with associated electrical connectors for testing the battery may be removably received within a suitable spring clamp 29 also carried by one of the tray brackets 10 as shown.

From the foregoing description it will be observed that the present invention provides a novel cart or vehicle for transporting storage batteries and other heavy objects from place-to-place and which embodies novel features of construction and arrangement whereby in the loading and unloading position of the cart the carrying tray thereof is disposed in a lowered position with respect to the height of the tray in the normal operating position of the cart. The invention also provides a novel cart or vehicle as set forth which has associated therewith the usual equipment and devices customarily utilized in the testing and servicing of storage batteries. In addition, the cart of the present invention is of relatively simple and inexpensive construction and is highly effective in operation and use.

While a particular embodiment of the invention has been illustrated and described herein it is not intended to limit the invention to such disclosure and changes and modifications may be made therein and thereto within the scope of the following claims.

I claim:

1. In a cart for transporting storage batteries and other heavy articles, a pair of spaced parallel frame members rearwardly inclined in the normal position of the cart, wheels mounted at the lower ends of the frame members, brackets secured to and projecting forwardly from the frame members and braced therefrom, a carrying tray pivotally suspended from the outer ends of said brackets, means on the frame and tray members arranged for cooperative interengagement in the normal position of the cart to maintain the tray in a substantially horizontal position, support legs on the carrying tray adapted to engage the ground and support said tray in a lowered horizontal position upon tilting the cart about the wheels in the forward direction, and a rack for a water jar pivotally suspended intermediate said frame members.

2. A cart for transporting storage batteries and other heavy articles, a pair of spaced parallel frame members rearwardly inclined in the normal position of the cart, wheels mounted in the lower ends of the frame members, brackets secured to and projecting forwardly from the frame members and braced therefrom, a carrying tray pivotally suspended from the outer ends of said brackets, means on the frame and tray members arranged for cooperative interengagement in the normal position of the cart to maintain the tray in a substantially horizontal position, and support legs on the carrying tray adapted to engage the ground and support said tray in a lowered horizontal position upon tilting the cart about the wheels in the forward direction.

CHARLES A. ADAMS.

REFERENCES CITED

The following references are of record in the file of this patent:

UNITED STATES PATENTS

| Number | Name | Date |
|---|---|---|
| 517,642 | Campbell | Apr. 3, 1894 |
| 1,020,509 | McDaniel | Mar. 19, 1912 |
| 1,021,880 | Neble et al. | Apr. 2, 1912 |
| 1,637,640 | Hendricks | Aug. 2, 1927 |
| 2,396,325 | Jimenez | Mar. 12, 1946 |